US005375203A

United States Patent [19]

Lambidakis

[11] Patent Number: 5,375,203

[45] Date of Patent: Dec. 20, 1994

[54] METHOD AND APPARATUS FOR PARTIAL DISPLAY AND MAGNIFICATION OF A GRAPHICAL VIDEO DISPLAY

[75] Inventor: George W. Lambidakis, Aptos, Calif.

[73] Assignee: SuperMac Technology, Inc., Sunnyvale, Calif.

[21] Appl. No.: 195,332

[22] Filed: Feb. 14, 1994

Related U.S. Application Data

[63] Continuation of Ser. No. 779,398, Oct. 18, 1991, Pat. No. 5,293,482.

[51] Int. Cl.[5] .......... G06F 15/62

[52] U.S. Cl. .......... 395/162; 395/164; 395/166; 348/578; 345/190

[58] Field of Search .......... 365/189.12; 345/197, 345/190, 189; 395/162, 164, 166, 425, 137, 138, 139; 348/578, 583

[56] References Cited

U.S. PATENT DOCUMENTS

| | | | |
|---|---|---|---|
| 4,070,710 | 1/1978 | Sukonick et al. | 364/900 |
| 4,796,231 | 1/1989 | Pinkham | 365/189 |
| 4,833,625 | 5/1989 | Fisher et al. | 364/518 |
| 4,884,069 | 11/1989 | Farand | 340/799 |
| 5,021,772 | 6/1991 | King et al. | 340/724 |
| 5,075,675 | 12/1991 | Barker et al. | 340/721 |
| 5,093,807 | 3/1992 | Hashimoto et al. | 395/230.09 |
| 5,125,043 | 6/1992 | Karlsson | 382/47 |
| 5,199,101 | 3/1993 | Cusick et al. | 395/115 |
| 5,208,583 | 5/1993 | Cusick et al. | 340/723 |
| 5,227,863 | 7/1993 | Bilbrey et al. | 358/22 |

FOREIGN PATENT DOCUMENTS

| | | | |
|---|---|---|---|
| 431845A2 | 6/1991 | European Pat. Off. | G09G 1/16 |
| 9008816B | 11/1990 | Rep. of Korea | G06F 3/153 |
| 9203277B | 4/1992 | Rep. of Korea | G06F 13/00 |

*Primary Examiner*—Robert L. Richardson
*Attorney, Agent, or Firm*—Limbach & Limbach

[57] ABSTRACT

This video graphics display system includes an apparatus that allows any portion of the complete image to be displayed independently. Focusing on a specific area of an image, or panning, results in a significant change in the relationship between the data stored in the video memory and the arrangement of the pixels on the monitor. This display system recalculates the timing and location of the multiple data transfers necessary to display any portion of the graphics data held in memory. The required data transfers are performed through a handshake between the SMT02 and the BSR03. This handshake allows data transfers to occur during the monitor blanking period and in spite of restrictions imposed by the video memory specifications.

12 Claims, 6 Drawing Sheets

TYPICAL VRAM CONFIGURATION

TYPICAL DISPLAY NO. 1

TYPICAL DISPLAY NO. 2

** NOTE THAT THE MID-LINE DATA TRANSFER COMPLETES PRIOR TO THE ONSET OF HORIZONTAL BLANKING

TYPICAL DISPLAY

TYPICAL VRAM CONFIGURATION

METHOD AND APPARATUS FOR PARTIAL DISPLAY AND MAGNIFICATION OF A GRAPHICAL VIDEO DISPLAY

This is a continuation of pending application Ser. No. 07/779,398, filed Oct. 18, 1991 and now U.S. Pat. No. 5,293,482.

FIELD OF THE INVENTION

This invention relates to the field of controlling a graphical video display. More particularly, this invention relates to a method and apparatus for the control of the display and enlargement of portions of a virtual video display.

BACKGROUND OF THE INVENTION

A video graphics system typically includes a display monitor, a controller circuit, and video memory combined with a shift register. Typical monitors have a screen which comprises an array of pixels that are illuminated by an electron beam. The video memory contains the data necessary to instruct the beam relative to the illumination of each pixel.

Each pixel is defined by some number of memory bits; a single bit can be used for monochromatic displays, or multiple bits can be used to improve the resolution and provide the control required for gray scale and color displays. Image quality improves with the number of bits used to define each pixel. This image quality ratio is commonly referred to as bits-per-pixel (bpp). Image quality also increases with the number of pixels per inch that the screen can display, i.e., the pixel density.

In order for a display to illuminate, or "draw" an image, information defining each pixel on that display must be transferred from the video memory to the controller circuit and then to the display. The display information for each pixel has a unique address in the video memory, which is selected by the control circuitry. The information stored at that address is then sent to the display.

There are a variety of standard video displays. Each type of display has an array comprised of specific number of rows and columns of pixels. The electron beam sweeps across each line of the screen one line at a time from left to right within the display. The beam illuminates each line of pixels, according to the information transferred from the video memory. Upon reaching the right side of the display, the beam is temporarily deactivated and withdrawn to the left hand side, in preparation for the illumination of the next line. The period of time during which the beam returns to the left of the screen is referred to as the monitor's blanking time. By scanning the display at a higher rate (i.e., more pixels per unit time), and shortening the blanking time, higher resolution images are possible.

The image that is displayed on a video monitor or display does not always represent the entire image that is stored in the video memory. The display being viewed is often a section or percentage of the complete image, the area being displayed having been selected by the video system controller. This section and display of specific areas of an image is referred to as "panning". Panning is used when working with small-screen displays and when displaying a portion of a large or complex image (also called a "virtual desktop"). In other words, the entire bit map stored in memory contains more information than can actually be displayed on a monitor at any given moment. Thus, the display is panned throughout the virtual desktop, according to the operator's needs.

Having selected a specific area of an image for display, it is often desirable to be able to change the size of the image. Many graphics systems offer this capability—commonly referred to as "zoom". Zoom allows portions of a complex image to be magnified so that it may be edited, or reduced so that it may be viewed in relation to the complete image. The mechanics of the zoom feature will not be discussed here. Zoom is mentioned because its use is often dependent upon the system's ability to pan.

The methods currently available to provide panning are not equally efficient with all displays. The variation in the number and arrangement of the pixels on each display type results in a corresponding variation in the way the data defining those pixels is moved from memory to the display. With some display types, this results in areas of the image that cannot be specifically displayed in a certain place on the display without loss of resolution. The system's ability to apply the zoom function to a specific portion of the display is obviously affected, because the system must be able to pan to the desired pixels before it can magnify or reduce them.

SUMMARY OF THE INVENTION

This video graphics display system includes an apparatus that allows any portion of the complete image to be displayed independently. Focusing on a specific area of an image, or panning, results in a significant change in the relationship between the data stored in the video memory and the arrangement of the pixels on the monitor. This display system recalculates the timing and location of the multiple data transfers necessary to display any portion of the graphics data held in memory. The required data transfers are performed through a handshake between the SMT02 and the BSR03. This handshake allows data transfers to occur during the monitor blanking period and in spite of restrictions imposed by the video memory specifications.

DETAILED DESCRIPTION OF THE PREFERRED EMBODIMENT

The present invention is described below relative to a preferred embodiment, in particular, for use with high-resolution graphics systems monitors having horizontal blanking intervals of less than 1 microsecond. However, it will be appreciated by a person of ordinary skill in the art that this invention may be applied to other types of systems requiring similar control for its video graphics.

In a typical graphics system, the image on the video display is updated 60–70 times per second. This is referred to as the refresh rate of the display. The SMT02 is a video graphics system controller designed in part by the inventor and which is made and sold by SuperMac Technology, Inc. To accomplish the refresh operation, the SMT02 system controller contains the address in video memory which corresponds to the first pixel to be displayed (often the top, left corner) and initiates a beginning-of-screen data transfer. As the first line of the image (or frame) is drawn by the monitor's electron beam, the SMT02 controls the transfer of a continuous stream of pixels from the video memory shift register through the BSR03 controller and ultimately to the display. The number of pixels needed to produce one line of the display may require multiple data transfers from the video memory through the register.

Upon completion of the first line, the electron beam deactivates, returns to the left side of the display and positions itself to draw the second line. While the beam is being repositioned, the monitor enters a state referred to as horizontal blanking. During this period, end-of-line and beginning-of-line data transfers occur. The process described above is repeated for each line of the display, until all the lines have been illuminated and the image is complete. Then, the monitor enters a period called vertical blanking during which the beam is deactivated and repositioned to the upper left hand corner of the display.

Figure 1:
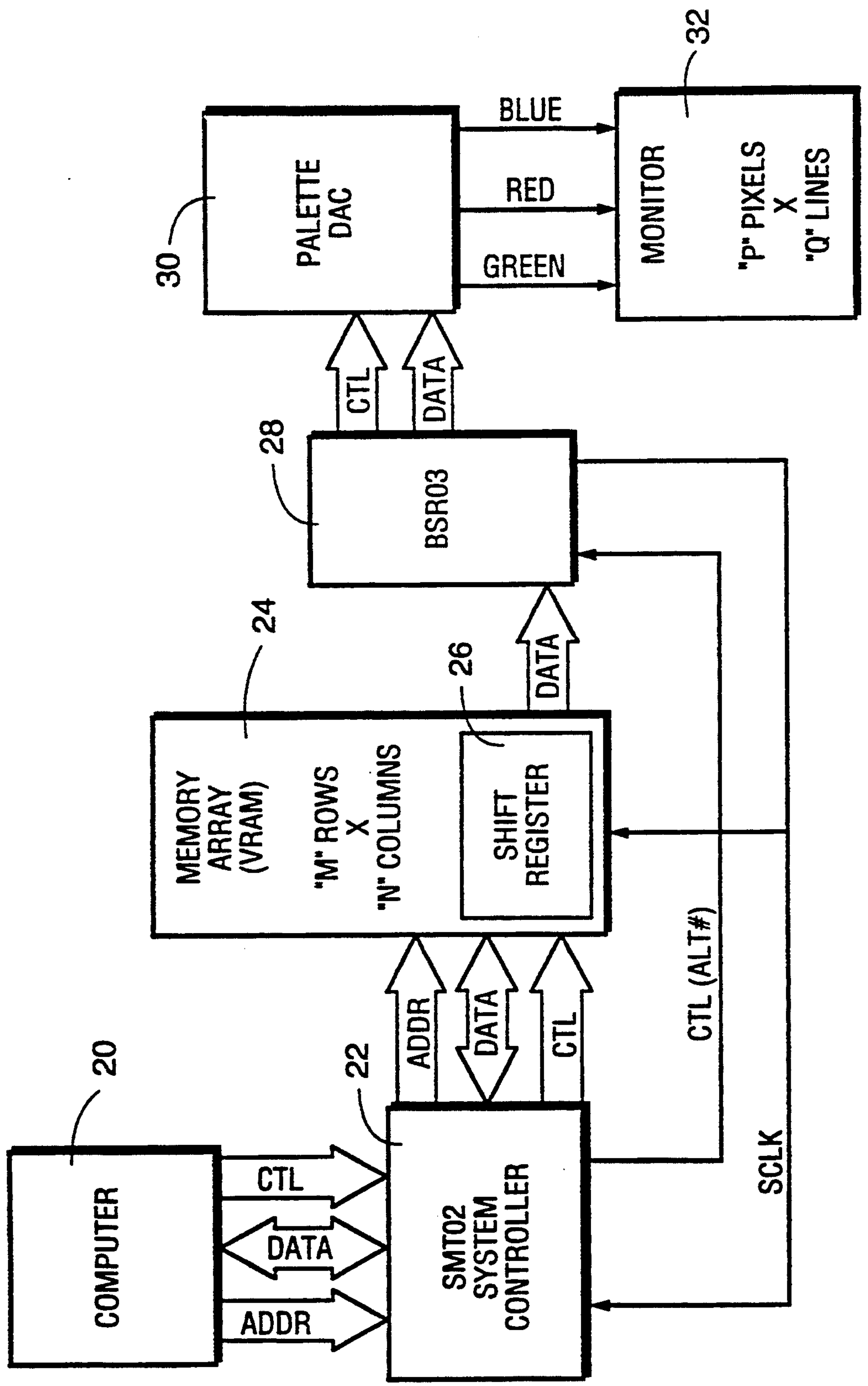
FIG. 1 is a representation, in block diagram form, of the video display logic.

FIG. 1 is a block diagram of the video display logic. A computer or processor 20 is coupled to provide address data and control commands to the SMT02 system controller 22. A data bus is also coupled between the computer 20 and the SMT02 system controller 22. A data bus is coupled between the SMT02 controller 22 and the video memory array 24.

Similarly, the SMT02 system controller 22 is coupled to provide address data and control signals to a video memory array 24. Preferably, the video memory array comprises video random access memory integrated circuits (VRAM). The video memory array 24 is arranged to have M rows by N columns. A shift register 26 forms an integral part of the memory array 24. The memory array 24 is coupled to provide data to a bit shift register 28. The data is shifted from the shift register 26 into the bit shift register 28. A palette digital to analog controller (DAC) 30 is coupled to receive data and control signals from the bit shift register 28. The system controller 22 is coupled to provide a control signal to the bit shift register 28. The bit shift register 28 provides a shift clock to the memory array 24 and the system controller 22. The palette DAC 30 changes the digital signals it receives from the bit shift register 28 and transforms them into red, green and blue analog signals which are provided to the monitor 32. The monitor 32 displays an array of color pixels. The array is P pixels wide and Q lines high.

FIG. 1 illustrates the video circuitry. The transfer of pixel data from the video memory to the display is controlled by the SMT02. Just before the monitor completes a vertical blanking period, a beginning-of-line transfer is needed. The system controller presents the beginning-of-line address to the video memory (VRAM) that corresponds to the location of the first pixel to be sent to the monitor. An entire row of pixels, starting at the specified address, is transferred from the VRAM memory array to the VRAM shift register, under the control of the SMT02. The pixels are then serially shifted out of the VRAM shift register to and under control of the BSR03. Then, BSR03 can manipulate the data or simply shift it to logic that converts the digital information to analog signals. These analog signals are then sent to the video monitor.

Figure 2A:
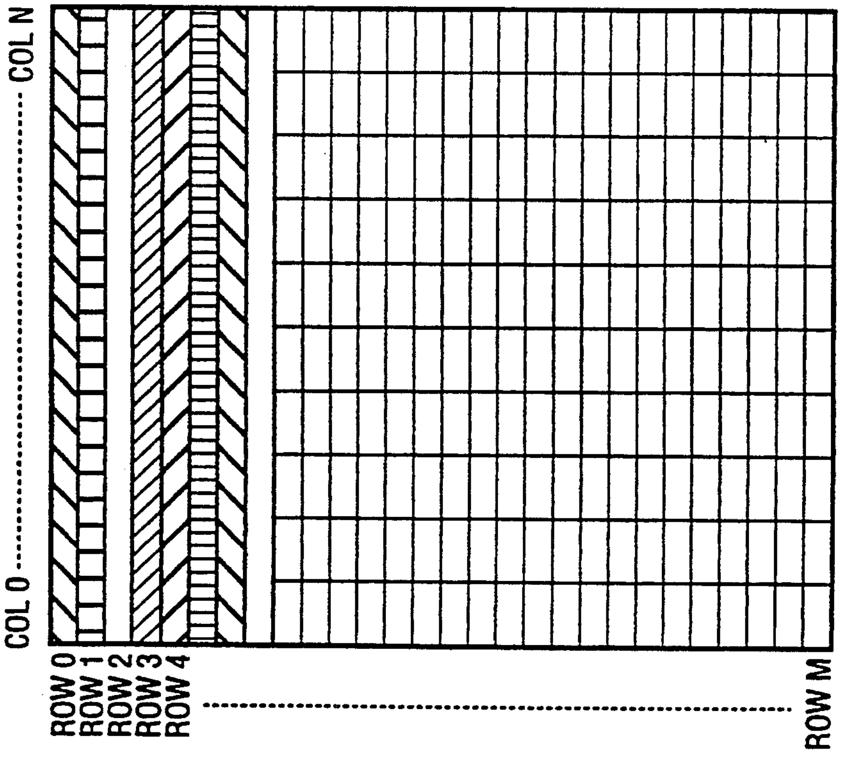
FIGS. 2(*a*), 2(*b*), and 2(*c*) are representations of the relationship between the arrangement of pixels in the VRAM and their arrangement on the video display.
Figure 2B:
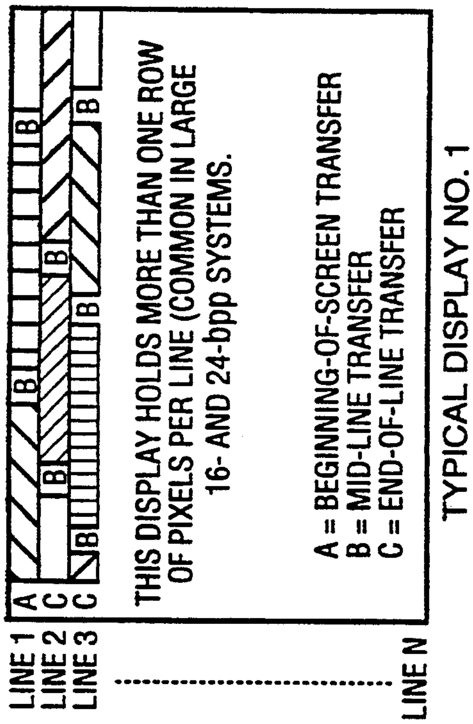
Figure 2C:
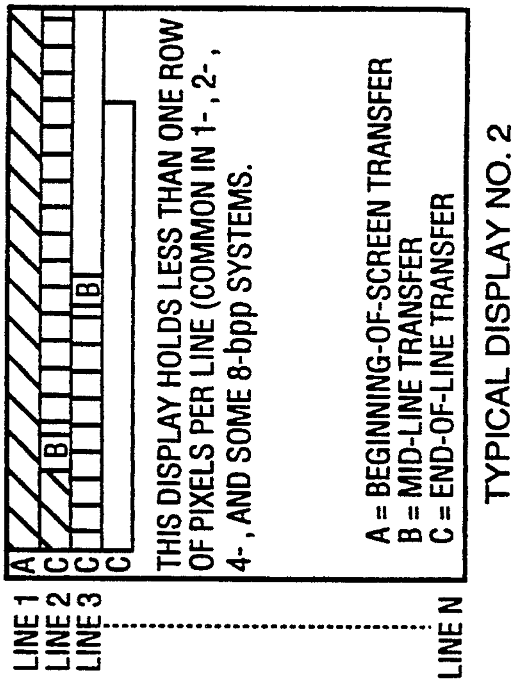

There are two types of data transfer cycles: those that occur when the display is active (mid-line data transfers) and those that only occur during the monitor's blanking period (beginning-of-field/frame and end-of-line data transfers). FIG. 2 illustrates how video memory is arranged relative to the display.

A mid-line transfer is the transfer of a new memory row of pixel data from the memory array (VRAM) to the VRAM shift register such that the last pixel of the preceding row is followed by the first pixel of the new row. Because the display is active during this type of transfer, the timing of mid-line data transfers is critical. If the system fails to load the data as a continuous stream the display image will break. The row being displaced will be split and the right hand end of the row will be shifted by the number of pixel cycles missed during the transfer. The SMT02 system controller loads data into the VRAM shift register which is then shifted into the BSR03. The SMT02 does this by monitoring the data remaining in the VRAM shift register. When data in the shift register drops to a programmable, predetermined level, the system controller will initiate a new mid-line data transfer cycle.

Figure 3:
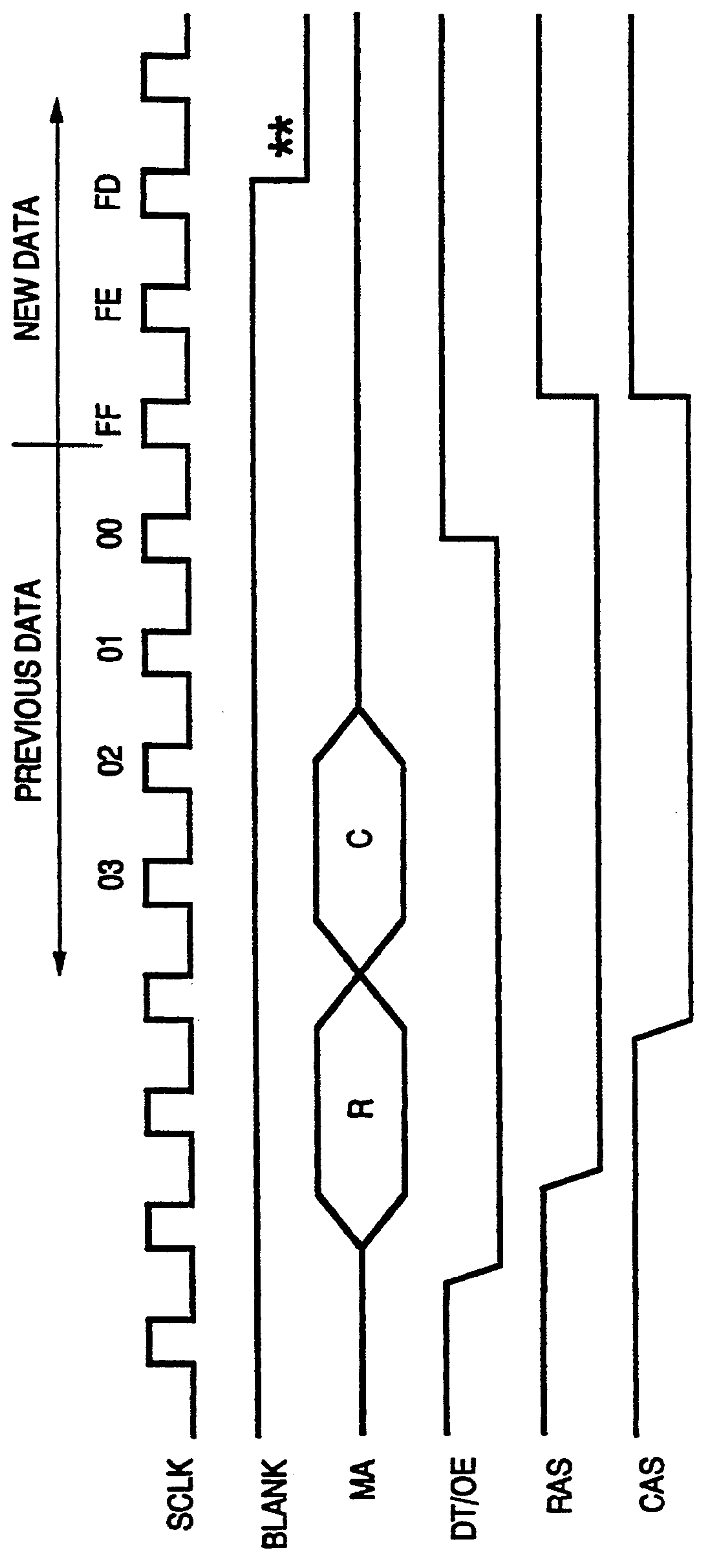
FIG. 3 is a representation of a Mid-Line Data Transfer Cycle.

FIG. 3 shows an illustration of the timing sequence for a mid-line data transfer. In order to smoothly and seamlessly transfer data from the VRAM memory array to the VRAM shift register, the row and column addresses for the new data must be present. The system of FIG. 3 presumes that the shift register contains 256 (0×FF hex) pixels of information. The shift clock (SCLK) toggles repeatedly to initiate the transfer of each pixel data from the VRAM shift register to the BSR03 bit shift register. At a predetermined pixel location in the VRAM shift register, usually near the end of the data in the shift register, the data transfer/output enable line (DT/OE) is asserted. The row address (R) for the memory array (VRAM) is provided to the memory address (MA) port of the memory array (VRAM). Then the address is latched via the row address strobe (RAS) signal. The column address (C) is then provided to the memory address (MA) part and it is latched via the column address strobe (CAS).

Once the data for the last pixel has been strobed into the BSR03 bit shift register, the DT/OE signal is deasserted which latches the new data into the VRAM shift register. After the data has been latched, the RAS and CAS lines are deactivated.

End-of-line data transfers are less time critical, as they take place following the transfer of the last pixel required to display the end of the preceding line on the video monitor. At this time, the monitor undergoes horizontal blanking, and the beam is momentarily inactive. The shift clock (SCLK), which triggers the data transfer, is deactivated during this period. Consequently, no new data is clocked out of the VRAM shift register. The end-of-line transfer loads pixel data for the beginning of the next line. This data is held for transfer to the display until the SCLK signal is reasserted.

Figure 4:
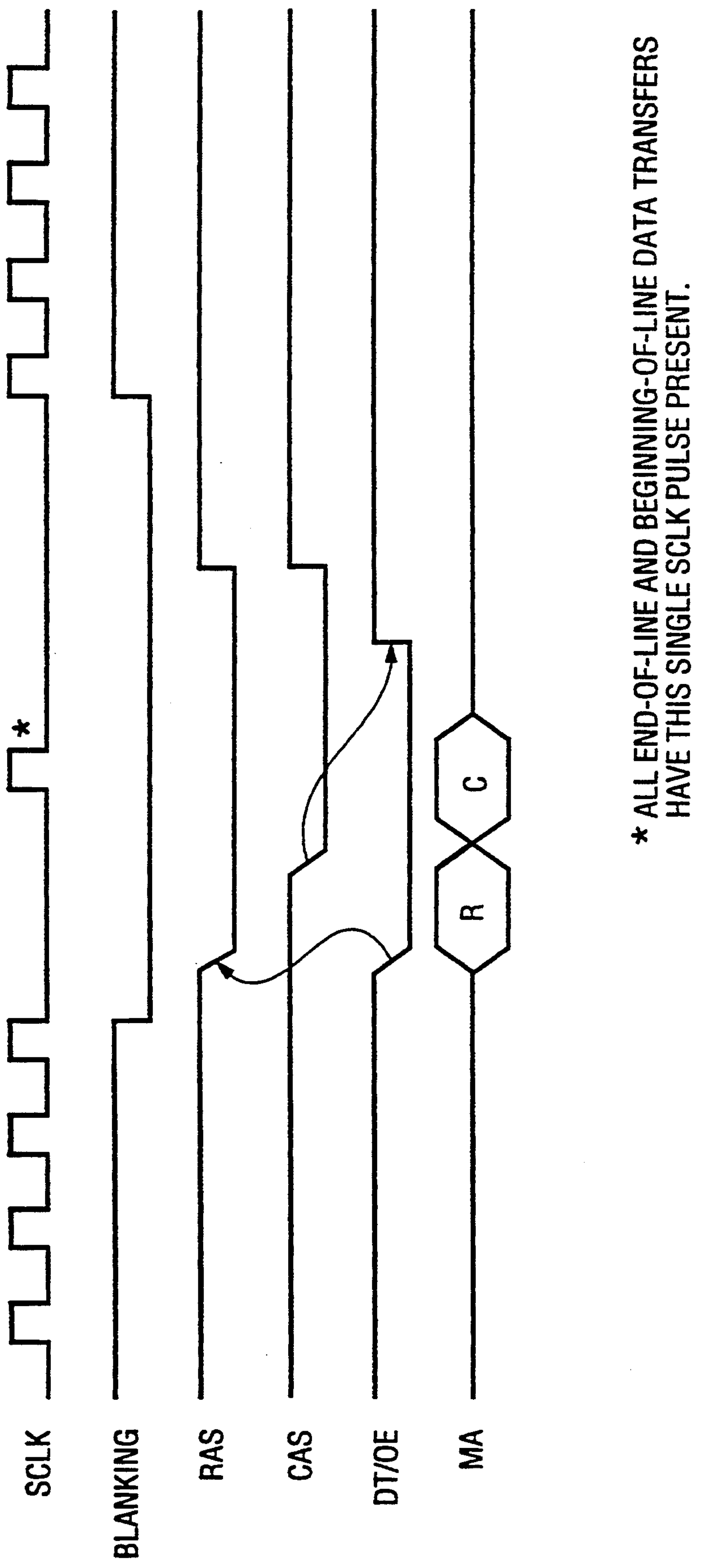
FIG. 4 is a representation of an End-of-Line Data Transfer Cycle.

FIG. 4 shows an illustration of the timing sequence for an end-of-line data transfer. The shift clock (SCLK) pulse activates the transfer of data from the VRAM shift register. Once the data for the last pixel in the display line is transferred from the shift register to the display, the horizontal blanking signal deactivates the shift clock (SCLK). The DT/OE signal is asserted. The row address (R) for the memory array (VRAM) is applied to the memory address (MA) port and then latched via the row address strobe (RAS). Then, the column address (C) is applied to the memory address (MA) port and latched via the column address strobe (CAS). A single shift clock (SCLK) is forced by the SMT02 during each horizontal blanking period following the de-assertion of the DT/OE signal which prepares the data to be latched into the VRAM shift register. The DT/OE and then RAS and CAS signal then return to the inactive state. After the horizontal blanking signal becomes inactive, the shift clock (SCLK) begins shifting the data from the VRAM shift register.

Beginning-of-frame data transfers also take place during horizontal blanking. This transfer occurs once per frame, and loads the data for the first pixel of the new frame to be illuminated. This is also true for each field when the display is interlaced.

When panning to a specific area of a virtual desktop, the relationship of the mid-line and end-of-line transfers change relative to the display. In certain circumstances, within several pixels after the beginning of displaying a new line, only the last few bits of the row of data in the register need to be transferred to the display, before the next row needs to be transferred from the memory array to the VRAM shift register. An ordinary controller will not have time to effect the second transfer and still maintain the integrity of the display.

Figure 5B:
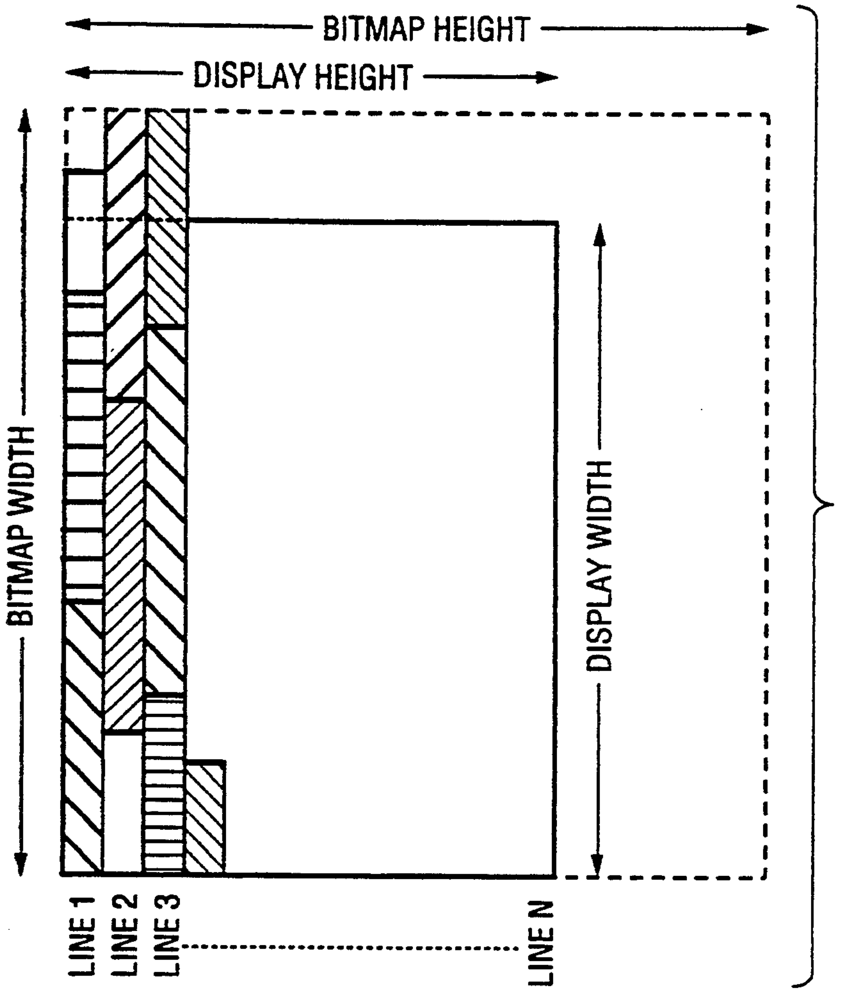
FIGS. 5(*a*) and 5(*b*) are representations of the relationship of the pixels to the video display, when performing the panning function.
Figure 5A:
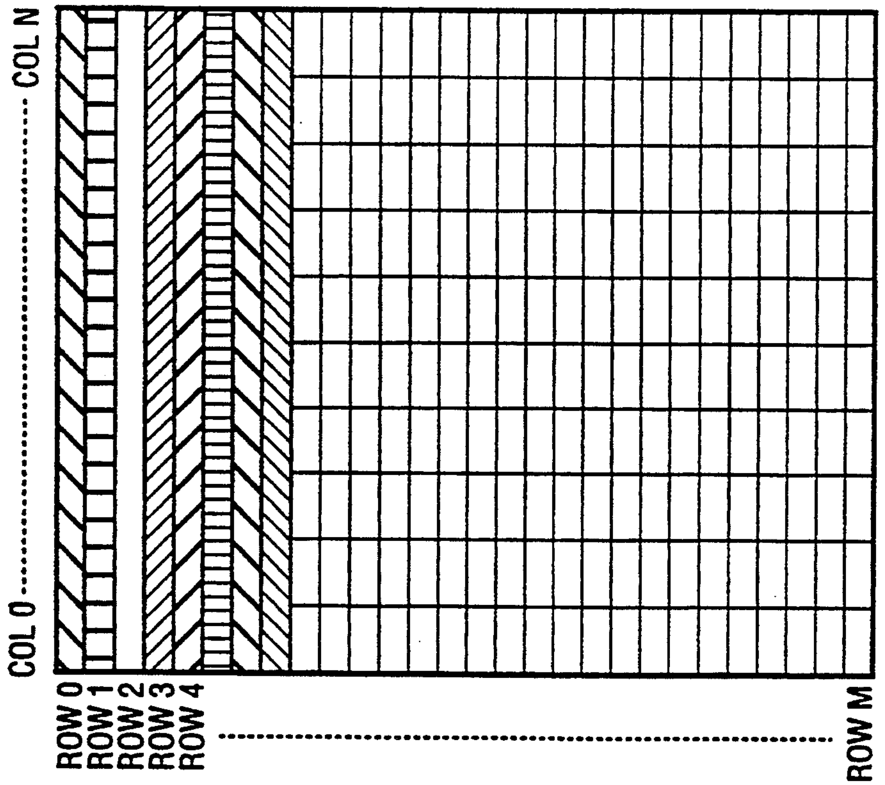

The solution to this problem is illustrated in FIG. 5. The SMT02 controls this operation by first loading a start address into the VRAM that represents the beginning of the particular area to be displayed. This start address, and all subsequent mid-line and end-of-line transfers may not correspond to the beginning of a new row of VRAM data. In order to support the panning to any pixel on the display, the system controller must anticipate a worst-case condition in which the first pixel of the area to be displayed is the last pixel in the VRAM shift register.

A transfer controller includes a position comparator (a counter), controlled by the shift clock SCLK which initiates a second data transfer cycle when only a predetermined number of pixels remain to be transferred from the register. If the image is changed by panning or zooming, it is possible and likely that the entire contents of the VRAM shift register may not be transferred to the display. Thus, the position comparator point is relative to the end of the VRAM shift register.

Figure 6:
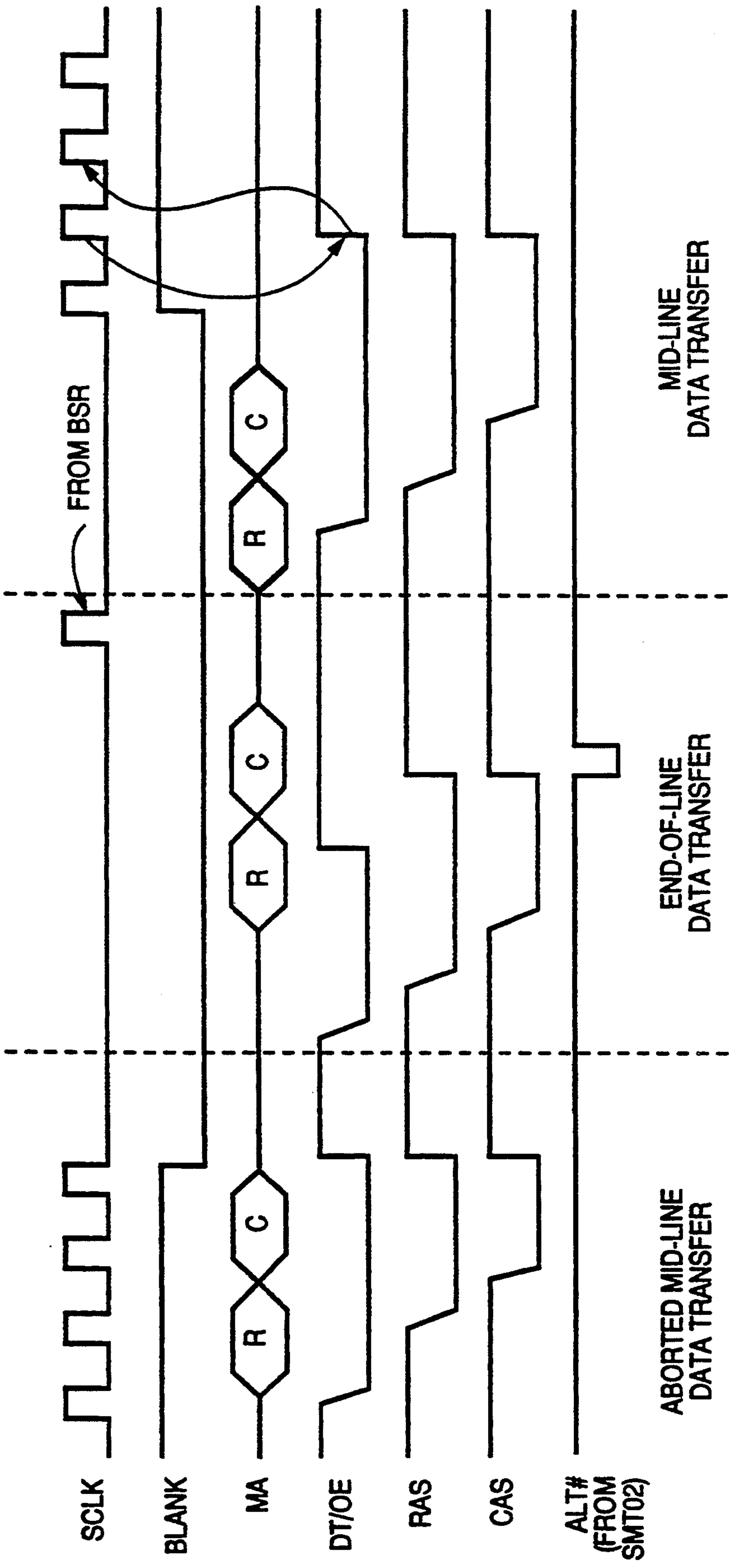
FIG. 6 is a representation of a Mid-Line (aborted)-/EOL/Mid-Line Data Transfer Sequence.

In certain circumstances, once the end-of-line data transfer cycle is complete, the position comparator determines that a mid-line data transfer cycle will be needed within several shift clocks (SCLK) after horizontal blanking becomes inactive (i.e., once pixel display is resumed). In such circumstances, the system will latch the memory address to the memory array via the RAS and CAS signals and then latch the data to the register via the DT/OE. Then, while the horizontal blank signal is still active, the system will latch the next memory address to the memory array via the RAS and CAS signals. Thus, the system is now pre-conditioned to begin shifting data from the register to the display and to transfer the next row of data from the memory array to the register as shown in FIG. 6.

In the worst-case example, the area being panned requires a mid-line data transfer near the onset of horizontal blanking. This mid-line data transfer cycle is initiated yet is never completed because of the onset of horizontal blanking (which in turn deactivates the shift clock (SCLK)). This mid-line data transfer cycle needs to be terminated in order to perform the required end-of-line transfer cycle. If the first pixel to be displayed in the new line is also the last pixel in the VRAM shift register, then a second mid-line transfer will be necessary.

To accomplish this, the first mid-line transfer is initiated, but aborted before the data is shifted out to the display. Then, the end-of-line data transfer will load the next pixel row from the VRAM into the shift register, overwriting the data stored there by the aborted mid-line transfer. The first pixel to be shifted out to the monitor (with the assertion of SCLK) is also the last pixel in the shift register. This requires that a second mid-line transfer be initiated during the horizontal blanking period. The two obstacles to this operation are that the shift clock is not running during the blanking period and that most VRAMs require at least one shift clock pulse between data transfer cycles.

The SMT02 overcomes these obstacles by first initiating the end-of-line data transfer cycle. The data is transferred from the VRAM to a shift register, where it waits for the SCLK pulse that will shift it into the BSR03. The system controller then signals the BSR03 that the transfer is complete via the ALT# signal. The BSR03 responds by generating a single shift clock, which loads the end-of-line data. The SMT02 recognizes this single clock pulse, and checks the amount of data currently in the shift register. If the data level is below the predetermined point, the system controller will retain bus ownership and initiate a mid-line data transfer. The data transfer can not be completed until SCLK is reasserted, so the SMT02 will remain in a suspended state, with all of the memory signals asserted. With the assertion of SCLK, following the end of the blanking period, the system controller will complete the transfer as a normal mid-line data transfer.

Communication between the SMT02 and the BSR03 is accomplished by two signal lines—ALT# and SCLK. ALT# is sent from the SMT02 to the BSR03. SCLK is sent from the BSR03 to the SMT02. The communication between the SMT02 and the BSR03 allows virtually any pixel to be panned and then magnified, despite shortened blanking periods and varying display sizes.

What is claimed is:

1. A panning method for transferring for display a selected subset of data stored in rows of storage locations in a memory array, where the data determine pixels, and each of the rows contains a first number of elements of the data, said method including the steps of:

in response to first control signals, transferring streams of the elements from the memory array to a data storage means; and in response to second control signals, transferring the streams from the data storage means to a display means during intervals between blanking periods, to cause the display means to draw lines of the pixels during said intervals, wherein the first control signals control transfer of the streams to the data storage means with sufficiently small delay to enable panning from any selected one of the pixels.

2. A system for performing panning operations in which subsets of stored pixel data are selectively transferred for display, comprising:

a memory array which stores data in rows of storage locations, where the data determine pixels, and where each of the rows contains a first number of elements of the data;

display means for drawing lines of the pixels during intervals between blanking periods;

a data storage means connected between the display means and the memory array for receiving streams of the elements from the memory array, and transferring said streams to the display means during the intervals between blanking periods, in response to control signals; and control means for generating the control signals and supplying said control signals to the data storage means, wherein the control signals control transfer of the streams from the memory array to the data storage means with sufficiently small delay to enable panning from any selected one of the pixels.

3. A system for performing panning operations in which subsets of stored data are selectively transferred for display, comprising:

a memory array which stores data in rows of storage locations, where the data determine pixels, and where each of the rows contains a first number of elements of the data;

display means for drawing lines of the pixels during intervals between blanking periods;

a data storage means connected between the display means and the memory array for receiving streams of the elements from the memory array, and transferring said streams to the display means during said intervals between blanking periods; and control means, in two-way communication with the data storage means, for enabling panning from any selected one of the pixels.

4. The system of claim 3, wherein the memory array includes shift register means, the data storage means receives said streams of the elements from the shaft register means, and the control means includes:

means for controlling shift register functions to transfer selected streams of the elements from the shift register means to the data storage means.

5. The system of claim 3, wherein the control means includes means for controlling execution of mid-line transfers, aborted mid-line transfers, and end-of-line transfers, of selected streams of the elements from the memory array to the data storage means.

6. The system of claim 5, wherein the control means includes means for controlling execution of at least two transfer cycles selected from the group consisting of mid-line transfers, aborted mid-line transfers, and end-of-line transfers, during any one of said intervals between blanking periods.

7. The system of claim 6, wherein said at least two transfer cycles include a first transfer cycle followed by a second transfer cycle, and wherein the control means initiates execution of the second transfer cycle upon determining that the data storage means contains no more than a predetermined number of said elements.

8. A panning method in which a selected subset of stored data is transferred from a memory array for display, where the memory array stores data in rows of storage locations, the data determine pixels, and each of the rows includes elements of the data, said method including the steps of:

in response to first control signals, executing a sequence of transfer cycles to transfer streams of the elements from said rows to a data storage means; and in response to second control signals, transferring said streams from the data storage means to a display means during intervals between blanking periods, to cause the display means to draw lines of the pixels during said intervals between blanking periods.

9. The method of claim 8, wherein the transfer cycles are selected from the group consisting of mid-line transfers, aborted mid-line transfers, and end-of-line transfers.

10. The method of claim 8, wherein the memory array includes a shift register means, and the transfer cycles are executed by implementing shift register functions to transfer said streams of the elements from the shift register means to the data storage means.

11. The method of claim 8, wherein the sequence of transfer cycles includes a first transfer cycle and a second transfer cycle, and wherein both the first transfer cycle and the second transfer cycle are executed during one of said intervals between blanking periods.

12. The method of claim 8, wherein the sequence of transfer cycles includes a first transfer cycle followed by a second transfer cycle, and including the steps of:

(a) initiating the first transfer cycle;

(b) after step (a), initiating the second transfer cycle in response to a status signal which indicates that the data storage means contains no more than a predetermined number of said elements.

* * * * *